(12) United States Patent
Du et al.

(10) Patent No.: US 6,302,626 B1
(45) Date of Patent: Oct. 16, 2001

(54) FIXED SUPPORT FOR VOICE COIL MOTOR

(75) Inventors: Chen-Chung Du, Hsinchu; Szu-Han Hu, Hsinchu Hsien; Te-Hui Yang, Hsinchu; Chun-Hsien Liu, Taipei, all of (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/488,277

(22) Filed: Jan. 20, 2000

(51) Int. Cl.[7] ............................. H02K 41/00; G11B 5/55
(52) U.S. Cl. ........................................... 410/12; 360/265.7
(58) Field of Search .................. 310/12, 13, 14; 360/265.7

(56) References Cited

U.S. PATENT DOCUMENTS 6,061,206 * 5/2000 Foisy et al. ................. 360/265.7

* cited by examiner

Primary Examiner—Nestor Ramirez
Assistant Examiner—Judson H. Jones
(74) Attorney, Agent, or Firm—Baker Botts LLP

(57) ABSTRACT

A fixed support for voice coil motor comprises a coil, hollow plate, opening, structural reinforcement beam, and a plurality of pins. The pins extruding from the hollow plate allows the coil to wind around them. The opening, which locates on the center of the hollow plate, distributes stress concentration around the center. The structural reinforcement beam, which extrudes from an edge of the hollow plate, improves stiffness of the fixed support, thereby allowing the hollow plate to be made thinner.

3 Claims, 4 Drawing Sheets

FIXED SUPPORT FOR VOICE COIL MOTOR

FIELD OF THE INVENTION

This invention relates to a Voice Coil Motor (VCM), and more particularly to a fixed support for voice coil motor.

BACKGROUND OF THE INVENTION

A fixed support of voice coil motor is a base for winding coil thereon. One conventional fixed support is shaped like a plate, from which several pins extrude for receiving winded coil. For a better rigidity, the plate of fixed support is usually machined in a relatively great thickness. However a fixed support with thick plate will reduce the density of magnetic flux through the plate, which is generated by pairs of permanent magnets at each side of the plate, thereby lowering output power of the voice coil motor adopting the fixed support. Even if the thickness of the plate was simply thinned out, the rigidity of the plate would be degraded, thus making this change unlikely. Another fixed support is formed together with coil by an injection mold. Through the fixed support could be machined much thinner than the forgoing one, it suffers financial burden due to the high cost of the injection mold. In many cases, when cost turns to a crucial issue, the fixed support manufactured by injection mold will not be a cost efficient one anymore. Thus, there is a huge need to provide a fixed support with a plate as thin as possible, while maintaining its cost competitiveness.

FIG. 1 shows a conventional fixed support of voice coil motor, which includes a plate 30, several pins 10 extruding from the plate 30, and coil 20 winded around the pins 10. As a result of the wide thickness of the plate 30 of fixed support, the magnetic flux density, which is generated by pairs of permanent magnets from each side of the plate 30, is relatively low, therefore, reducing output torque of the voice coil motor adopting the fixed support. Moreover, as the mass distribution along the transverse direction of plate 30 remains asymmetric, the fixed support would likely vibrate fiercely when the voice coil motor rotates.

FIG. 2 shows another conventional design for fixed support 40 of voice coil motor. The fixed support 40 is fabricated much thinner than the above mentioned one through an injection mold. The Coil 50 is winded inner the fixed support 40, so as to ensure the fixed support to remain in a thin thickness and a relatively balanced mass distribution. Although the fixed support 40 provides better performance for voice coil motor than the above one does, its exists several shortcomings. Owing to the high cost of injection mold and complication of winding coils for various shaped fixed supports, the fixed support 50 will hard to be cost efficient unless manufacturing it in mass production.

SUMMARY OF THE INVENTION

This invention discloses a fixed support for voice coil motor comprising a coil, hollow plate, opening, structural reinforcement beam, and a plurality of pins. The pins extruding from the hollow plate allows the coil to wind around them, and the structural reinforcement beam improves stiffness of the fixed support. In addition, all the pins and structural reinforcement beam are carved out form the hollow plate. The opening, which locates on the center of the hollow plate, distributes stress concentration around the center.

For many voice coil motors, the present fixed support provides the following advantages such as, an improved stiffness, better heat release efficiency, easier manufacturing process, and decreased cost. Therefore, this invention would successfully overcome the aforementioned disadvantages caused by conventional fixed supports.

BRIEF DESCRIPTION OF THE DRAWINGS

FIG. 4 B is a cross-sectional view of the present fixed support in accordance with this invention.

DETAILED DESCRIPTION OF THE PREFERRED EMBODIMENT

Figure 1:
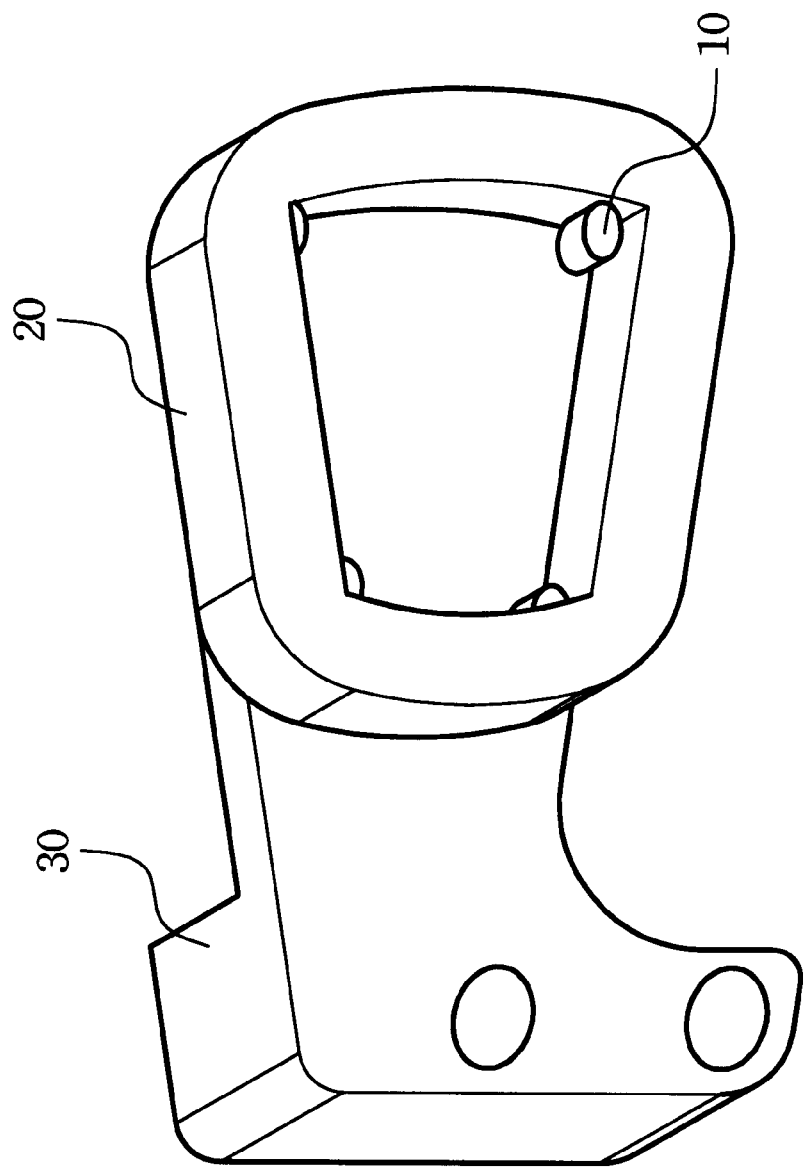
FIG. 1 illustrates a conventional fixed support for voice coil motor.
Figure 2:
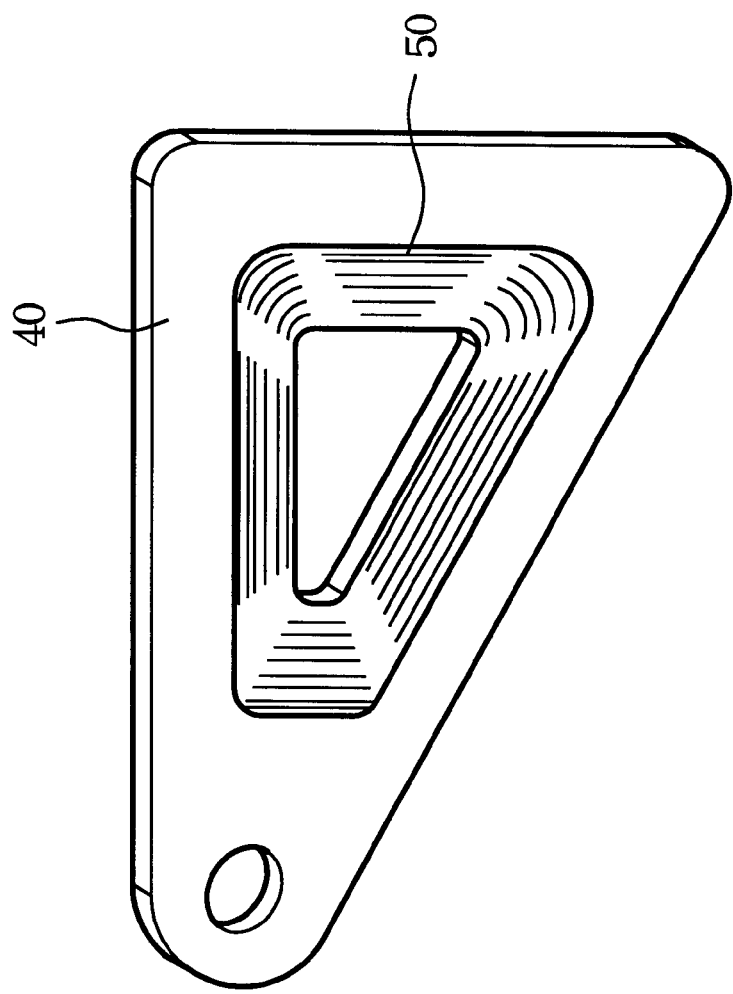
FIG. 2 illustrates another conventional fixed support for voice coil motor.
Figure 3:
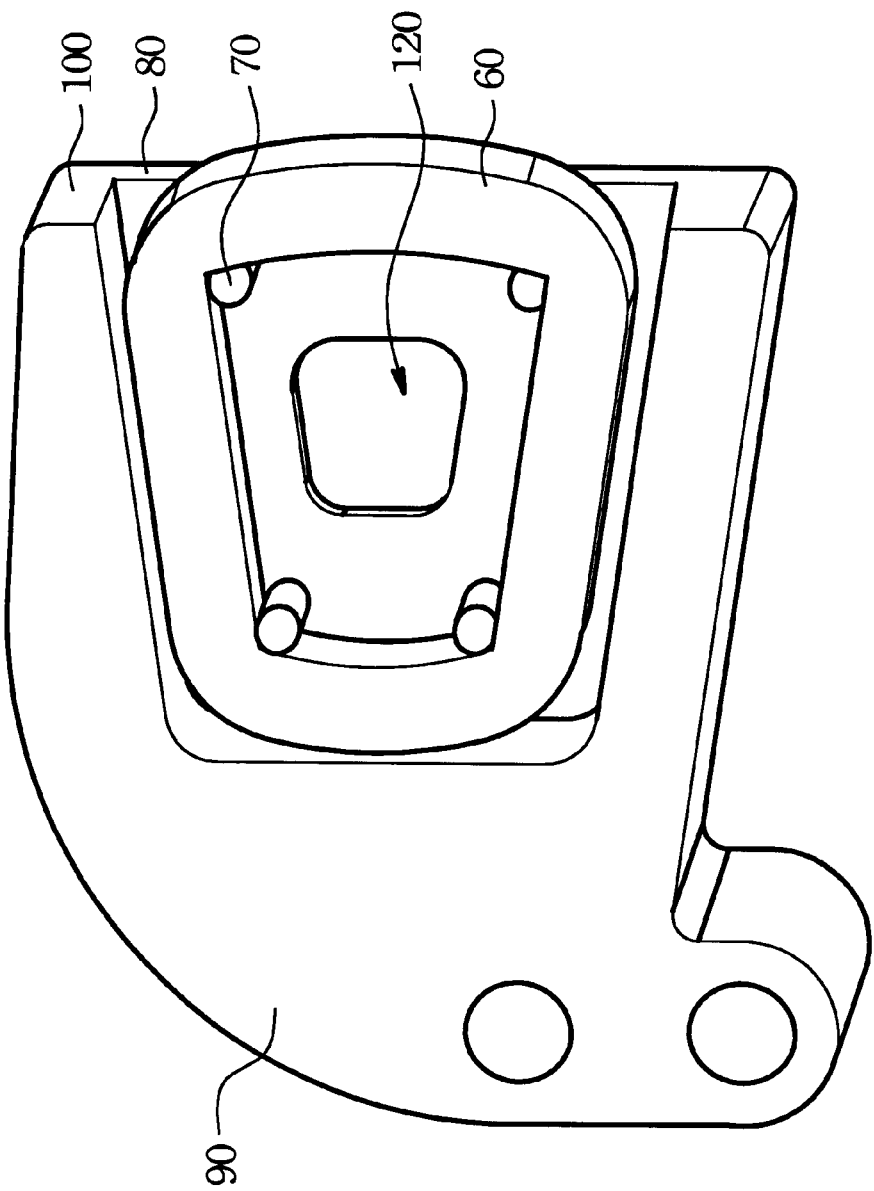
FIG. 3 illustrates a present fixed support for voice coil motor in accordance with this invention.

FIG. 3 illustrates a present fixed support 90 for voice coil motor. The fixed support 90 includes a hollow plate 80 with an opening 120, structural reinforcement beam 100, and several pins 70 extruding from the hollow plate 80. A coil 60 is winded around the pins 70, so as to provide the necessary alternate magnetic field, when coupling with an external power supply (not shown in this figure). In this embodiment, the pins 70 and structural reinforcement beam 100 may be carved out form the hollow plate 80, and the number of the pins is four.

The thickness of fixed support 90 is very thin, since the coil 60 is winded on the hollow plate 80 in stead of hanging out of the top surface of the fixed support 90. Winding the coil 60 on the hollow plate 80 is much easier than doing so on a fixed support fabricated by injection mold, and further helps to distribute the mass of the fixed support symmetrically, therefore, easing the vibration caused by asymmetric mass distribution. Moreover, the fixed support 90 could be easily shaped by conventional machining methods, so that the high cost of making an injection mold would be avoided. In addition, the structural reinforcement beam 100 and opening 120 also strengthen the stiffness of the fixed support 90 and facilitate its heat release.

Figure 4B:
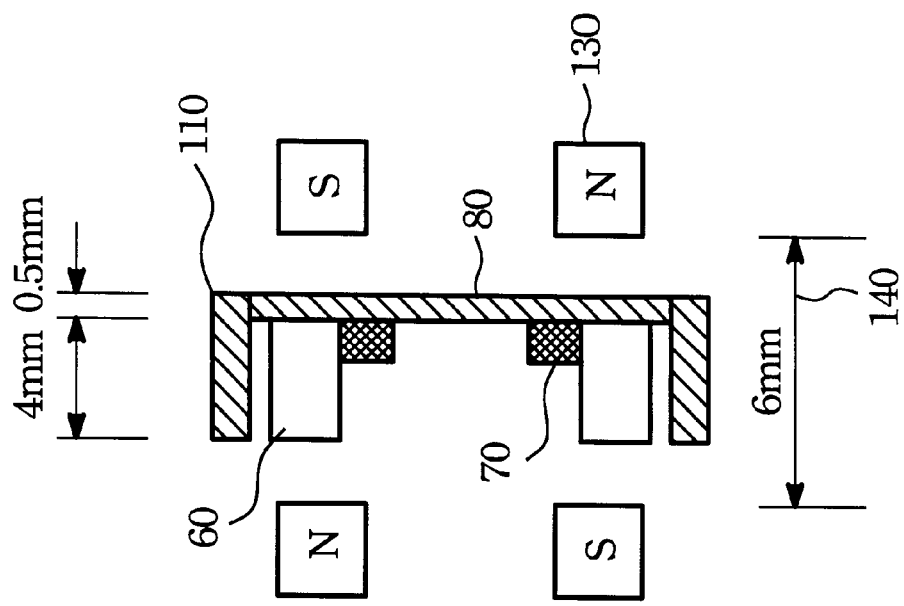
FIG. 4 A is a cross-sectional view of a conventional fixed support.
Figure 4A:
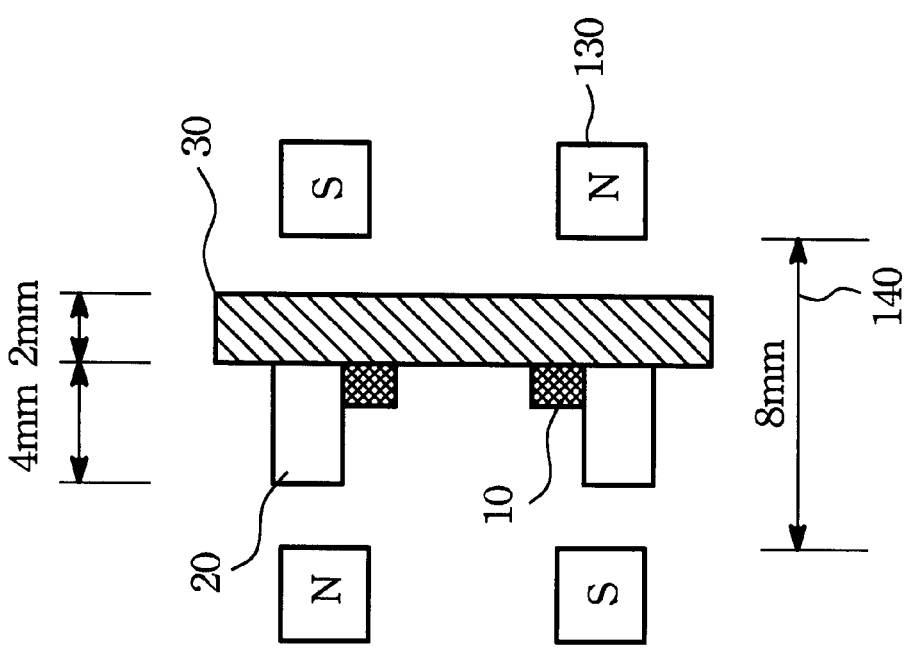

FIG. 4B is a cross-sectional view of the present fixed support. The U-shaped beam 110, which is the combination of the structural reinforcement beam 100 and hollow plate 80 (see FIG. 3), ensures a thin plate 80 in a thickness about 0.5 mm, while keeping its stiffness. This is because that the structural reinforcement beam 100 suffers the maximum stress and the opening 120 (see FIG. 3) distribute the concentrated stress in the center of the hollow plate 80. As the hollow plate keeps its thin width, the magnetic flux density caused by the pairs of permanent magnets 130 will remain high. Since the output torque of voice coil motor is determined by its magnetic flux density and the magnetic flux density depends on the distance between the pairs of permanent magnets, the present fixed support ensures a higher output torque than the conventional one does (see FIG. 4A), due to its closer permanent magnets 130. For instance, according to the dimensions shown in FIG. 4A and 4B, the weight of fixed support decreases form about 244 g of the conventional to 234 g of the present, and the total output torque increases form about 6350 G of the conventional to 7140 G of the present.

In brief then, for many voice coil motors, the present fixed support provides the following advantages such as, an improved stiffness, better heat release efficiency, easier manufacturing process, and decreased cost. Therefore, this invention would successfully overcome the aforementioned disadvantages caused by conventional fixed supports.

As is understood by a person skilled in the art, the foregoing preferred embodiments of the present invention that are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A fixed support for voice coil motor, comprising:

a coil;

a hollow plate having an opening locating on a center of the hollow plate for distributing stress concentration around the center;

a plurality of pins extruding from the hollow plate for allowing the coil to wind around the pins; and a structural reinforcement beam extruding from an edge of the hollow plate for improving stiffness of the fixed support.

2. The fixed support of claim 1, wherein the pin are carved out from the hollow plate.

3. The fixed support of claim 1, wherein a total number of the pins is four.

* * * * *